(12) United States Patent
Gustlin (10) Patent No.: US 8,699,523 B2
(45) Date of Patent: Apr. 15, 2014

(54) INDUCING PROTOCOL VIOLATIONS FOR IDENTIFYING A STREAM OF INFORMATION

(75) Inventor: Mark A. Gustlin, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 174 days.

(21) Appl. No.: 13/195,768

(22) Filed: Aug. 1, 2011

(65) Prior Publication Data

US 2013/0034111 A1 Feb. 7, 2013

(51) Int. Cl.
*H04J 3/24* (2006.01)
*H04J 3/04* (2006.01)

(52) U.S. Cl.
USPC .......................... 370/474; 370/476; 370/535

(58) Field of Classification Search
USPC .............. 370/464, 466, 467, 469, 474, 476, 370/532–537, 539, 541, 542
See application file for complete search history.

(56) References Cited

U.S. PATENT DOCUMENTS

| | | | |
|---|---|---|---|
| 6,266,325 B1 * | 7/2001 | Ishioka et al. | 370/248 |
| 2007/0127526 A1 * | 6/2007 | Xiong et al. | 370/474 |
| 2007/0255855 A1 | 11/2007 | Knapp et al. | |
| 2008/0107165 A1 * | 5/2008 | Nicolescu et al. | 375/232 |
| 2008/0212583 A1 * | 9/2008 | Rey et al. | 370/390 |

FOREIGN PATENT DOCUMENTS

| | | |
|---|---|---|
| DE | 33 12 400 A1 | 9/1984 |
| EP | 0 589 217 A1 | 3/1994 |
| EP | 1 133 123 A2 | 9/2001 |
| JP | 57 152257 A | 9/1982 |
| JP | 2 206243 A | 8/1990 |

OTHER PUBLICATIONS

PCT International Search Report and The Written Opinion of the International Searching Authority for PCT Application PCT/US2012/04431 (which claims priority to U.S. Appl. No. 13/195,768), ISA/EP, mailed Oct. 16, 2012 (twelve pages).

* cited by examiner

*Primary Examiner* — Xavier Szewai Wong
(74) *Attorney, Agent, or Firm* — The Law Office of Kirk D. Williams (57) ABSTRACT

In one embodiment, protocol violations of a particular protocol are induced at one or more predetermined intervals within a particular stream of information encoded according to the particular protocol in order to produce a marked particular stream of information for use in subsequent identification of the marked particular stream of information. The marked stream is multiplexed or otherwise communicated to a second device. The second device detects, and typically corrects, the induced protocol violations. And based on which stream of information included the induced protocol violations and the multiplexing/distribution pattern of the other streams of information, the second device can identify which stream is which and process or forward accordingly.

18 Claims, 7 Drawing Sheets

INDUCING PROTOCOL VIOLATIONS FOR IDENTIFYING A STREAM OF INFORMATION

TECHNICAL FIELD

The present disclosure relates generally to communicating multiple streams of information among devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity.

Accordingly, the ability to provide communications mechanisms and methodologies that allow greater bandwidth, achieve superior performance, and/or offer minimal delay presents a significant challenge for network equipment engineers and others.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with inducing protocol violations for identifying a stream of information. One embodiment includes one or more devices configured to induce protocol violations of a particular protocol at one or more predetermined intervals within a particular stream of information encoded according to the particular protocol in order to produce a marked particular stream of information for use in subsequent identification of the marked particular stream of information. In one embodiment, the configuration of said one or more devices includes multiplexing the marked particular stream of information with one or more other streams of information to produce a multiplexed stream of information.

One embodiment includes one or more devices configured to detect a repetitive protocol violation of a particular protocol within individual streams of a plurality of streams of information in order to identify a particular marked stream of the plurality of streams of information, with each of the plurality of streams encoded according to the particular protocol. In one embodiment, the configuration of said one or more devices includes demultiplexing a received stream of information into the plurality of streams of information and identifying an ordering of said individual streams of the plurality of streams of information based on said identified particular marked stream and a multiplexing ordering of the plurality of streams of information within the received stream of information. In one embodiment, the configuration of said one or more devices includes removing said detected repetitive protocol violations from said identified particular marked stream to produce a particular stream.

In one embodiment, the apparatus is an application-specific integrated circuit. In one embodiment, the particular protocol uses a 64/66 encoding technique that uses 2-bit sync headers, and wherein said inducing of said one or more protocol violations includes replacing a valid said 2-bit sync header with an invalid said 2-bit sync header.

2. Description

Disclosed are, inter alia, methods, apparatus, computer-storage media, mechanisms, and means associated with inducing protocol violations for identifying a stream of information. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Figure 1:
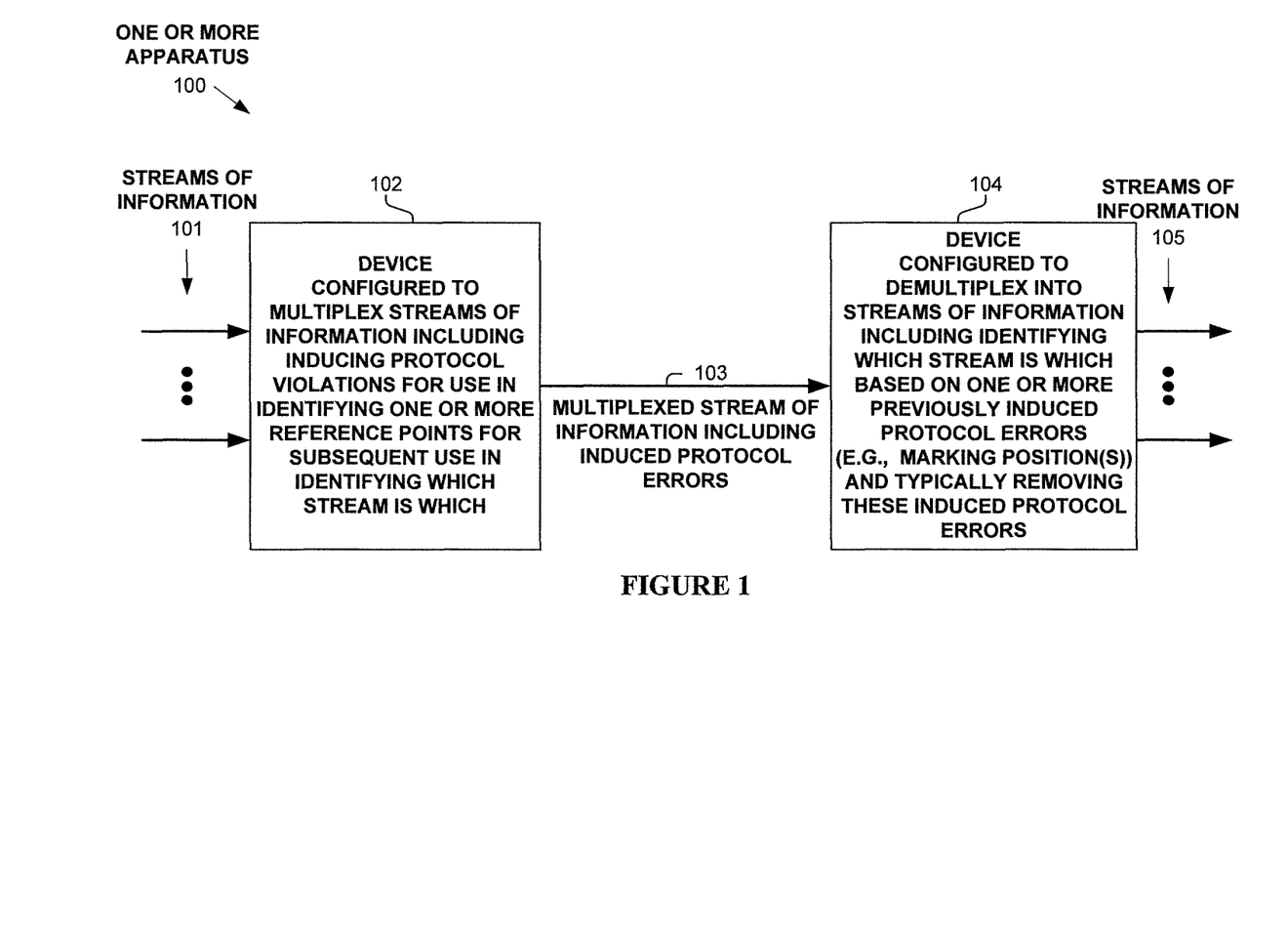
FIG. 1 illustrates one or more apparatus operating according to one embodiment.

Expressly turning to the figures, FIG. 1 illustrates one or more apparatus 100, including device 102 and device 104. As shown, multiple streams of information 101 are received by device 102, which is configured to multiplex these received streams of information, which includes inducing protocol violations for use in identifying one or more reference points for subsequent use in identifying which stream is which. In one embodiment, each, or at least more than one, stream is marked with protocol violation(s) so that each stream can subsequently be identified. As the multiplexer and subsequent demultiplexer will each operate according to a known deterministic multiplexing pattern, by having an identifiable reference point associated with a particular one of the streams of information, the demultiplexer can identify which particular stream is which.

For example, in a day of the week calendar context, if one knows that the 7$^{th}$ falls on a Thursday, then it is known that the 8$^{th}$ falls on a Friday, the 9$^{th}$ on a Saturday, etc. Similarly, if the multiplexing ordering is a round robin of five signals in the order of: 1, 2, 3, 4, 5; then if any one portion of the demultiplexed signals can be identified by the demultiplexer, say signal 3, then the demultiplexer knows the subsequent portions of the demultiplexed signals will correspond to signals 4, 5, 1, 2, 3, 4, 5, 1, 2 and so on.

For many applications, identifying which demultiplexed signal is which is important as they may be communicated to different locations. This means that the correct stream of information needs to be delivered to the correct location.

As shown, device 102 generates the multiplexed stream of information 103 including induced protocol error(s), which is received by device 104. Device 104 is configured to demultiplex the multiplexed stream of information 103 into multiple streams of information 105, including identifying which stream is which based on one or more previously induced protocol errors (e.g., marking a position within the multiplexing order, or identifying the streams themselves based on the type of protocol marking or lack thereof.). In one embodiment, device 104 removes these induced protocol errors, such that the streams of information 105 are typically the same as streams of information 101 (except for any transmission or other errors, signal processing by device 102 and/or 104, etc.).

Note, one embodiment does not multiplex these streams of information, but rather uses the same protocol violation technique to mark one or more streams (or individually identify one or more streams), such that which stream is which can subsequently be identified by a receiving device. This technique may be useful in certain configurations, such as, but not limited to when the interconnection between two devices can cause streams to be received on different ports of the receiving device. Thus, for example, once the receiving device has identified a reference point in one of the signals, the receiving device can identify which signal is which based on this reference point and knowing the distribution pattern of the signals.

Figure 2A:
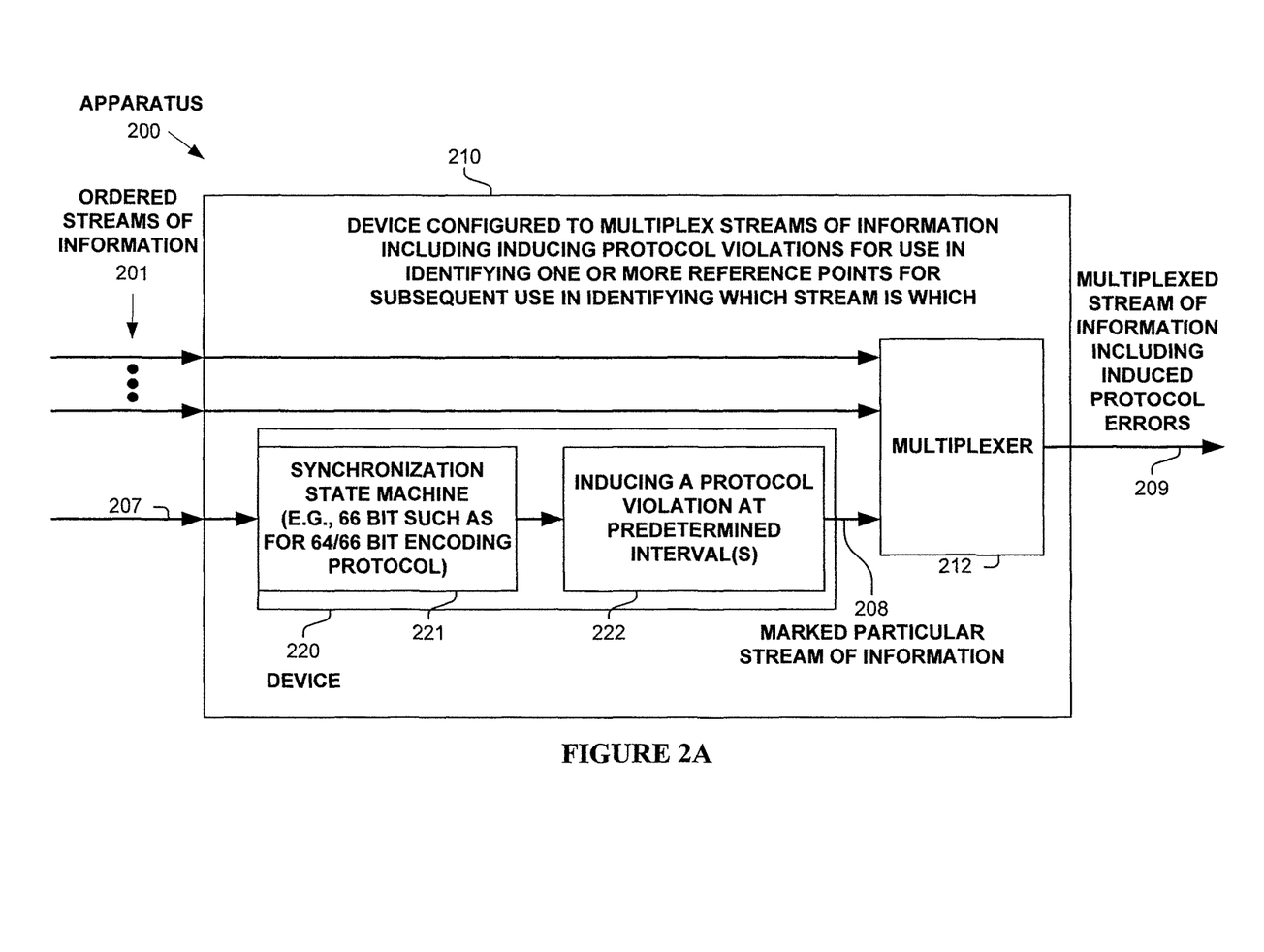
FIG. 2A illustrates one or more apparatus operating according to one embodiment.

FIG. 2A illustrates an apparatus 200, which includes device 210 configured to multiplex streams of information, which includes inducing one or more protocol violations for use in identifying one or more reference points within the multiplexed stream, for subsequent use in identifying which stream is which. As shown, device 210 includes device 220, which induces protocol violations in a single stream 207 of the received streams of information 201 producing marked particular stream of information 209. Device 210 may include discrete or the same hardware to perform protocol synchronization and protocol induced violations. In one embodiment, a device 220, 221 and/or 222 operates a state machine to synchronize to the received stream 207 according to a known protocol, then induces protocol violations at predetermined interval(s) in order to mark a detectable pattern within received stream 207 to produce marked particular stream of information 208. One embodiment induces these protocol violations in a manner which will not cause the receiving device to fall out of sync resulting from these induced protocol violations. In one embodiment, stream 207 is communicated using a 64/66 bit encoding protocol, and by inducing protocol violation every 16,000 66-bit blocks, does not result in an out of sync condition. However, this rate of protocol inducement allows an induced protocol violation detection state machine to synchronize to the stream in which the violations were inserted, and accordingly remove such violations, if desired.

One embodiment marks multiple streams of information by using different protocol violations, different patterns of protocol violations, and/or different insertion rates, etc. Thus, the different patterns of protocol violations can be detected and distinguished.

Also, by one embodiment marking or otherwise identifying one or more streams of information using protocol violations as described herein, the data within the packet stream is typically not analyzed (although it could be). For example, 64/66 bit encoding scrambles the data within packet streams. So, to properly insert a tag identifying a stream within the data of the stream itself, a receiving device of the stream would be required to descramble the data stream, insert the tag at an appropriate position, and then re-scramble the data stream. Thus, one embodiment disclosed herein requires less complexity and resources to mark and subsequently transmit a received stream of information.

Figure 2B:
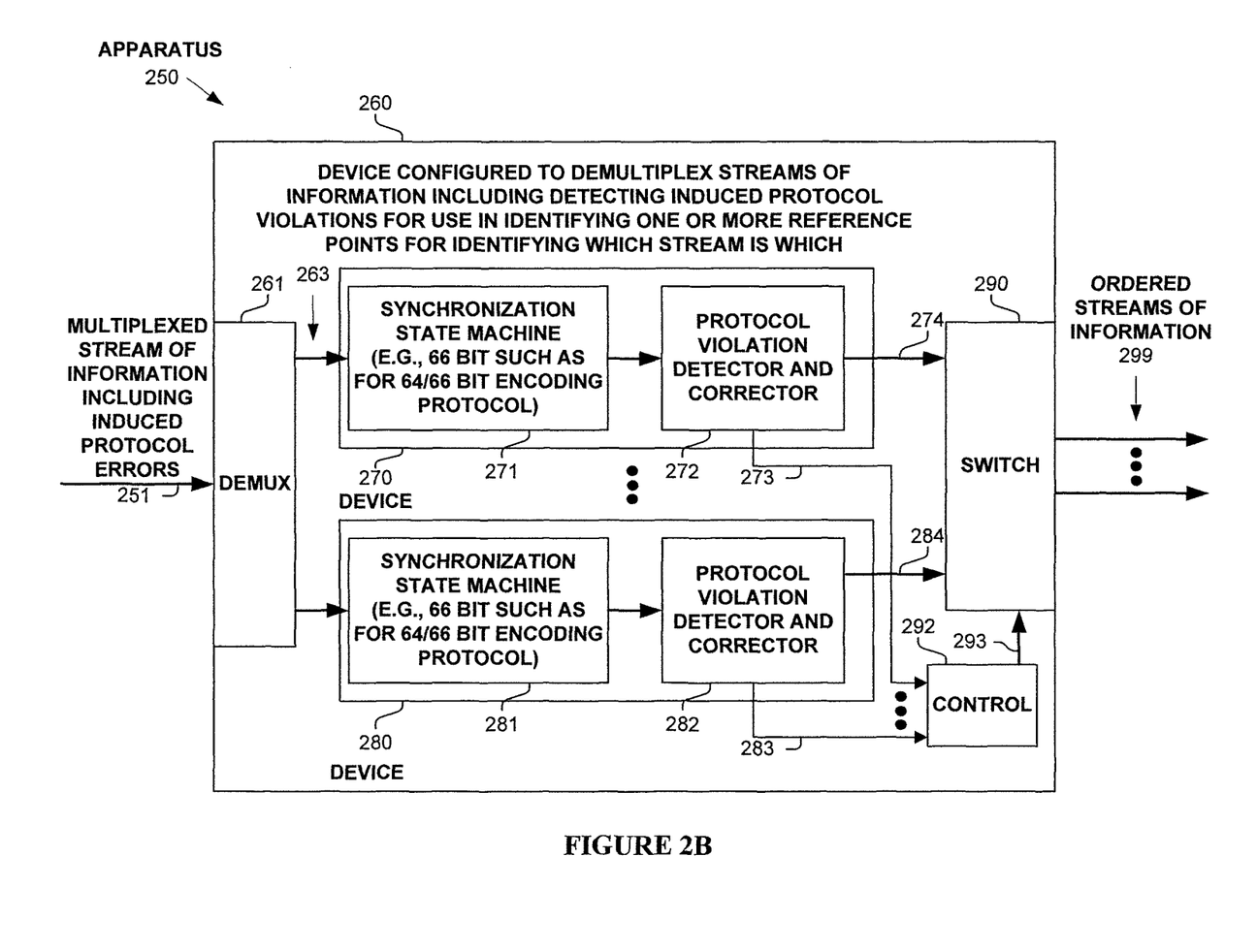
FIG. 2B illustrates one or more apparatus operating according to one embodiment.

FIG. 2B illustrates an apparatus 250, which includes device 260 configured to demultiplex streams of information from a received multiplexed stream 251, which includes detecting induced protocol violations in order to identify which stream is which. As shown, demultiplexer 261 demultiplexes received multiplexed stream of information 251 to generate demultiplexed streams of information 263. Further shown, device 260 includes devices 270 and 280 for operating on individual demultiplexed streams of information 263. Of course, one embodiment operates on more than two demultiplexed streams of information 263 as indicated by the multiple dots.

In one embodiment, a device 270, 271, and/or 272 operates a state machine to synchronize to a demultiplexed stream (263) according to a known protocol, and operates a second state machine to attempt to identify induced protocol violations (e.g., by apparatus 200 of FIG. 2A). In one embodiment, a device 280, 281, and/or 282 operates a state machine to synchronize to a demultiplexed stream (263) according to a known protocol, and operates a second state machine to attempt to identify induced protocol violations (e.g., by apparatus 200 of FIG. 2A). Corresponding signals (273, 283) are communicated to control 292 to identify which of the streams 263 include induced protocol violations, which are typically removed as represented by protocol violation correctors 272 and 282. Thus, streams of information 274 and 284 typically do not include the induced protocol violations.

According to the identification of one or more streams (263) including induced protocol violations, control 292 instructs (293) switch 290 to communicate information streams 274, 284 to proper outputs (299), according to an identified ordering based on the detected induced protocol errors, and typically also based on a knowledge of the relative ordering of streams 263 according to the multiplexing methodology.

Figure 3:
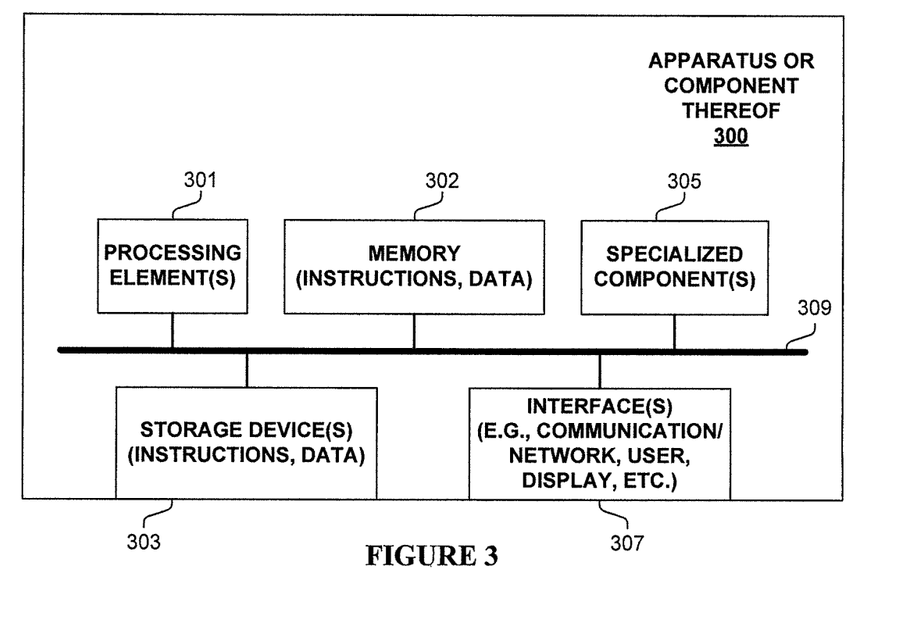
FIG. 3 illustrates one or more apparatus or components operating according to one embodiment.

FIG. 3 is a block diagram of an apparatus or component 300 used in one embodiment associated with inducing protocol violations for identifying a stream of information. In one embodiment, apparatus or component 300 performs one or more processes corresponding to one of the flow diagrams illustrated or otherwise described herein, and/or illustrated in another diagram or otherwise described herein. Note, one embodiment includes only a portion of apparatus or component 300, such as memory 302 coupled to one or more processing elements 301.

In one embodiment and as shown, apparatus or component 300 includes one or more processing element(s) 301, memory 302, storage device(s) 303, specialized component(s) 305 (e.g. optimized hardware such as for performing operations described herein, etc.), and interface(s) 307 for communicating information, which are typically communicatively coupled via one or more communications mechanisms 309 (e.g., wires, fibre, optical or electrical connections, etc.), with the communications paths typically tailored to meet the needs of a particular application. In one embodiment apparatus or component 300 corresponds to, or is part of, network device 102 or 104 of FIG. 1, apparatus 200 of FIG. 2A, and/or apparatus 260 of FIG. 2B.

Various embodiments of apparatus or component 300 may include more or fewer elements. The operation of apparatus or component 300 is typically controlled by processing element(s) 301 using memory 302 and storage device(s) 303 to perform one or more tasks or processes. Memory 302 is one type of computer-readable/computer-storage medium, and typically comprises random access memory (RAM), read only memory (ROM), flash memory, integrated circuits, and/or other memory components. Memory 302 typically stores computer-executable instructions to be executed by processing element(s) 301 and/or data which is manipulated by processing element(s) 301 for implementing functionality in accordance with an embodiment. Storage device(s) 303 are another type of computer-readable medium, and typically comprise solid state storage media, disk drives, diskettes, networked services, tape drives, and other storage devices. Storage device(s) 303 typically store computer-executable instructions to be executed by processing element(s) 301 and/or data which is manipulated by processing element(s) 301 for implementing functionality in accordance with an embodiment.

Figure 4:
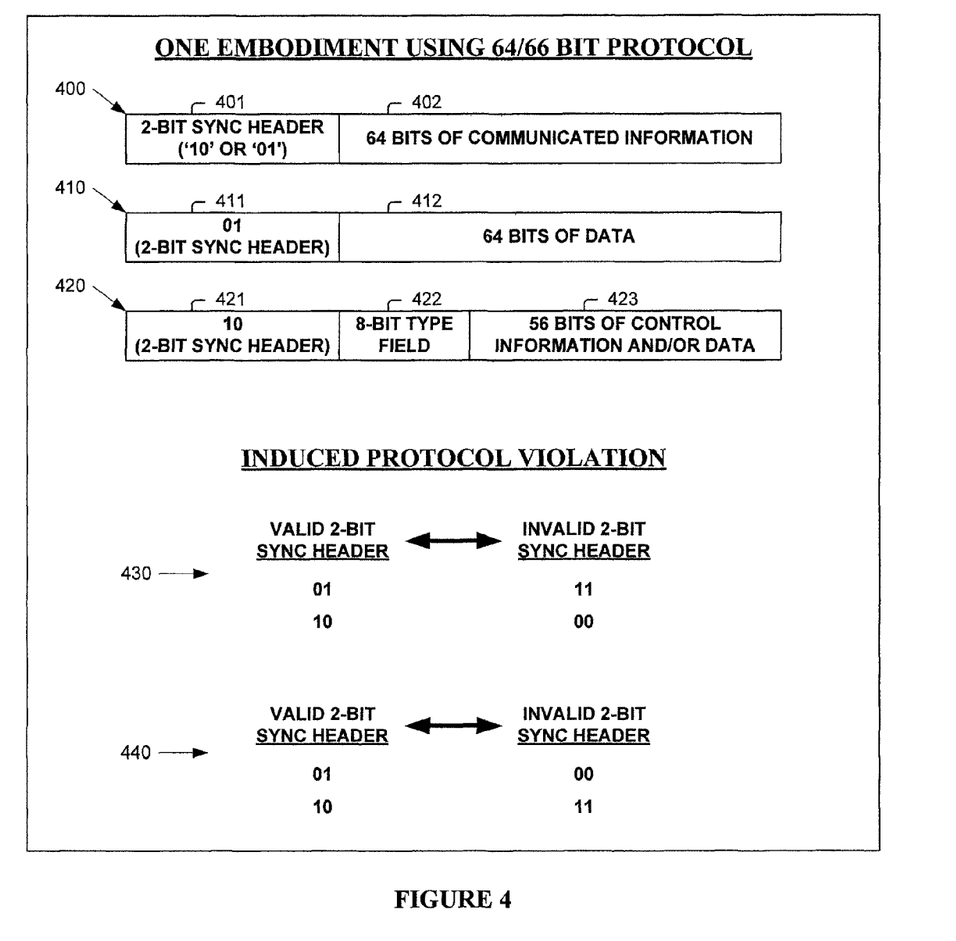
FIG. 4 illustrates examples of induced protocol violations performed in one embodiment.

FIG. 4 illustrates the inducement of protocol violations of one embodiment using a 64/66 bit protocol. As shown, the 64/66 bit protocol sends 64 bits of information (402) in a 66 bit data block (400) with an added 2-bit sync header (401). The 2-bit sync header (401) has two valid values: either '01' or '10'. As shown by data block 410, a sync header (411) having a value of '01' signifies all 64 bits are data (412). As shown by data block 420, a sync header (421) having a value of '10' signifies the 64 bits include an 8-bit type field (422) and 56 bits of control information and/or data (423).

One embodiment induces protocol violations by replacing valid 2-bit sync headers '01' and '10' with invalid 2-bit sync headers '11' and '00', respectively, as shown by mapping 430. One embodiment induces protocol violations by replacing valid 2-bit sync headers '01' and '10' with invalid 2-bit sync headers '00' and '11', respectively, as shown by mapping 440. Note, by mapping each valid 2-bit sync header to a predetermined different one of the invalid sync headers, the protocol violation corrector knows which valid 2-bit sync header to use to replace the particular invalid 2-bit sync header.

Figure 5:
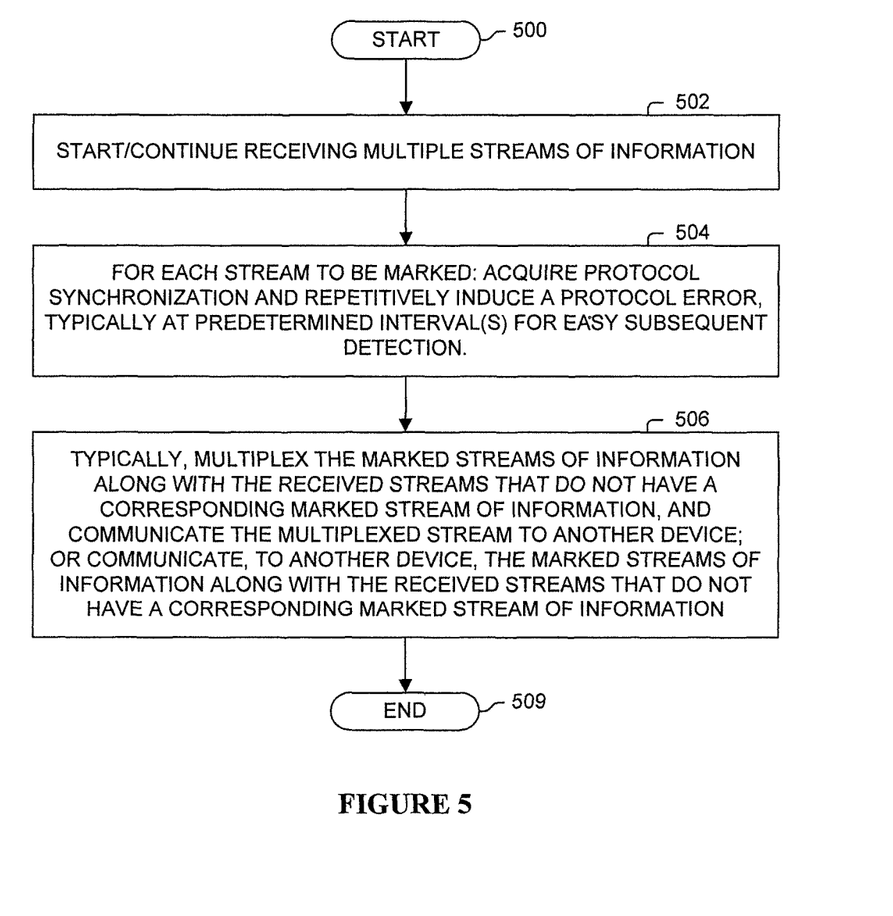
FIG. 5 illustrates a process performed in one embodiment.

FIG. 5 illustrates a process performed in one embodiment. Processing begins with process block 500. In process block 502, the apparatus starts/continues to receive multiple streams of information. In process block 504, for each stream to be marked: acquire protocol synchronization and repetitively induce a protocol error, typically at predetermined interval(s) for easy subsequent detection. In process block 506, typically, the marked streams of information are multiplexed along with the received streams that do not have a corresponding marked stream of information. The multiplexed stream is communicated to another device. In one embodiment, the marked streams of information along with the received streams that do not have a corresponding marked stream of information are not multiplexed, but are simply communicated to another device. Processing of the flow diagram of FIG. 5 is completed as indicated by process block 509.

Figure 6:
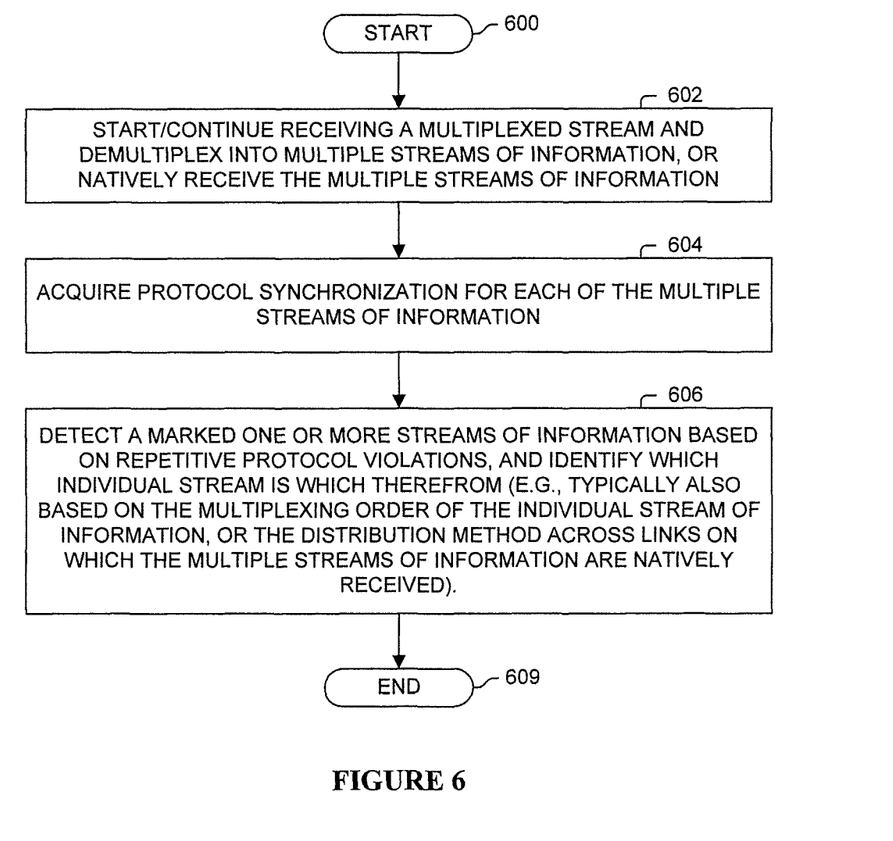
FIG. 6 illustrates a process performed in one embodiment.

FIG. 6 illustrates a process performed in one embodiment. Processing begins with process block 600. In process block 602, the apparatus starts/continues to receive the multiplexed stream of information which is demultiplexed into multiple streams of information, or the multiple streams of information are natively received. In process block 604, protocol synchronization is acquired for each of the multiple streams of information. In process block 606, one or more marked streams of information are detected based on repetitive protocol violations. Which individual stream is which is identified therefrom (e.g., typically also based on the multiplexing order of the individual streams of information, or the distribution method across links on which the multiple streams of information are natively received). Processing of the flow diagram of FIG. 6 is completed as indicated by process block 609.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
multiplexing, by a first device, a plurality of serial streams of information in a predetermined regularly repeating order, with each of the plurality of serial streams of information encoded via a particular protocol, with said multiplexing including inducing at one or more predetermined intervals one or more protocol violations into one or more of the plurality of serial streams of information to mark one or more reference positions within the predetermined regularly repeating order of said multiplexed plurality of serial streams of information;
receiving, by a second device, said multiplexed plurality of serial streams of information;
detecting, by the second device, at least one of said induced protocol violations to identify at least one of said one or more references positions within the predetermined regularly repeating order of said multiplexed plurality of serial streams of information; and
demultiplexing, by the second device, said multiplexed plurality of serial streams of information communicated to the second device using said identified at least one of said one or more references positions within the predetermined regularly repeating order of said multiplexed plurality of serial streams of information to identify which of said multiplexed plurality of serial streams corresponds to which of the plurality of serial streams of information.

2. A method, comprising:
inducing, by a first device at one or more predetermined intervals, a protocol violation into a particular stream of information encoded via a particular protocol to generate a marked particular stream of information;
multiplexing, by the first device, the marked particular stream of information with one or more other streams of information in a deterministic, identically repeating pattern to produce a multiplexed stream of information;
demultiplexing, by a second device, the multiplexed stream of information communicated to the second device to generate a plurality of streams of information, with the plurality of streams of information including the marked particular stream of information and said one or more other streams of information;
determining which stream of the plurality of streams of information is the marked particular stream of information by detecting at least one of said induced protocol violations; and
identifying each individual stream of said one or more streams of information based on the deterministic, identically repeating pattern used to produce the multiplexed stream of information and said determined marked particular stream of information within the multiplexed stream of information.

3. The method of claim 2, wherein said one or more streams of information include at least two streams of information.

4. The method of claim 3, including removing said induced protocol violations from the marked particular stream of information to produce the particular stream of information.

5. The method of claim 4, wherein the particular stream of information and said one or more other streams of information are received from one or more devices external to the first device.

6. The method of claim 5, wherein the particular stream of information and said one or more other streams of information are sent from the second device to one or more devices external to the first device.

7. The method of claim 6, wherein the particular protocol uses a 64/66 encoding technique that uses 2-bit sync headers, and wherein said inducing of said one or more protocol violations includes replacing a valid said 2-bit sync header with an invalid said 2-bit sync header.

8. The method of claim 2, wherein the particular protocol uses a 64/66 encoding technique that uses 2-bit sync headers, and wherein said inducing of said one or more protocol violations includes replacing a valid said 2-bit sync header with an invalid said 2-bit sync header.

9. The method of claim 8, wherein said valid 2-bit sync header are '10' and '01'; and wherein said invalid 2-bit sync header are '11' and '00'.

10. The method of claim 9, wherein said replacing a valid said 2-bit sync header with an invalid said 2-bit sync header includes: replacing a valid 2-bit sync header of '10' with an invalid 2-bit sync header of '11', and replacing a valid 2-bit sync header of '01' with an invalid 2-bit sync header of '00'; and
wherein said removing of said induced protocol violations includes replacing an invalid 2-bit sync header of '11' with a valid 2-bit sync header of '10', and replacing an invalid 2-bit sync header of '00' with a valid 2-bit sync header of '01'.

11. The method of claim 9, wherein said replacing a valid said 2-bit sync header with an invalid said 2-bit sync header includes: replacing a valid 2-bit sync header of '01' with an invalid 2-bit sync header of '11', and replacing a valid 2-bit sync header of '10' with an invalid 2-bit sync header of '00'; and
wherein said removing of said induced protocol violations includes replacing an invalid 2-bit sync header of '11' with a valid 2-bit sync header of '01', and replacing an invalid 2-bit sync header of '00' with a valid 2-bit sync header of '10'.

12. The method of claim 2, wherein said one or more predetermined intervals are infrequent enough so as to not cause a loss of synchronization of the particular protocol for the marked particular stream of information.

13. An apparatus, comprising:
one or more devices configured to synchronize a particular serial stream of information received by the apparatus according to a particular protocol and then to induce protocol violations of the particular protocol at one or more predetermined intervals within the particular serial stream of information encoded according to the particular protocol in order to produce a marked particular serial stream of information; and
a multiplexer configured to receive the marked particular serial stream of information and a plurality of ordered serial streams of information received by the apparatus but not synchronized by the apparatus, and configured to multiplex the marked particular serial stream of information and the plurality of ordered serial streams of information in a deterministic, regularly repeating pattern to produce a multiplexed serial stream of information marked with induced protocol errors.

14. The apparatus of claim 13, wherein the apparatus is an application-specific integrated circuit.

15. The apparatus of claim 13, wherein the particular protocol uses a 64/66 encoding technique that uses 2-bit sync headers, and wherein said inducing of said one or more protocol violations includes replacing a valid said 2-bit sync header with an invalid said 2-bit sync header.

16. An apparatus, comprising:
a demultiplexer configured to demultiplex a received serial stream of information into a plurality of received serial streams of information, with the plurality of received serial streams of information including a particular marked serial stream of information and a plurality of serial streams of information;
one or more devices configured to detect a repetitive protocol violation of a particular protocol within one of the plurality of received serial streams of information in order to identify the particular marked serial stream of information, and to remove the repetitive protocol violation from the particular marked serial stream of information to generate a compliant serial stream of information; and
a switch to arrange the compliant serial stream of information and the plurality of serial streams of information in a predetermined order based on the relative position of the particular marked stream of information within the received serial stream of information;
wherein each of the plurality of streams encoded according to the particular protocol.

17. The apparatus of claim 16, wherein the apparatus is an application-specific integrated circuit.

18. The apparatus of claim 16, wherein the particular protocol uses a 64/66 encoding technique that uses 2-bit sync headers, and wherein said inducing of said one or more protocol violations includes replacing a valid said 2-bit sync header with an invalid said 2-bit sync header.

* * * * *